UNITED STATES PATENT OFFICE.

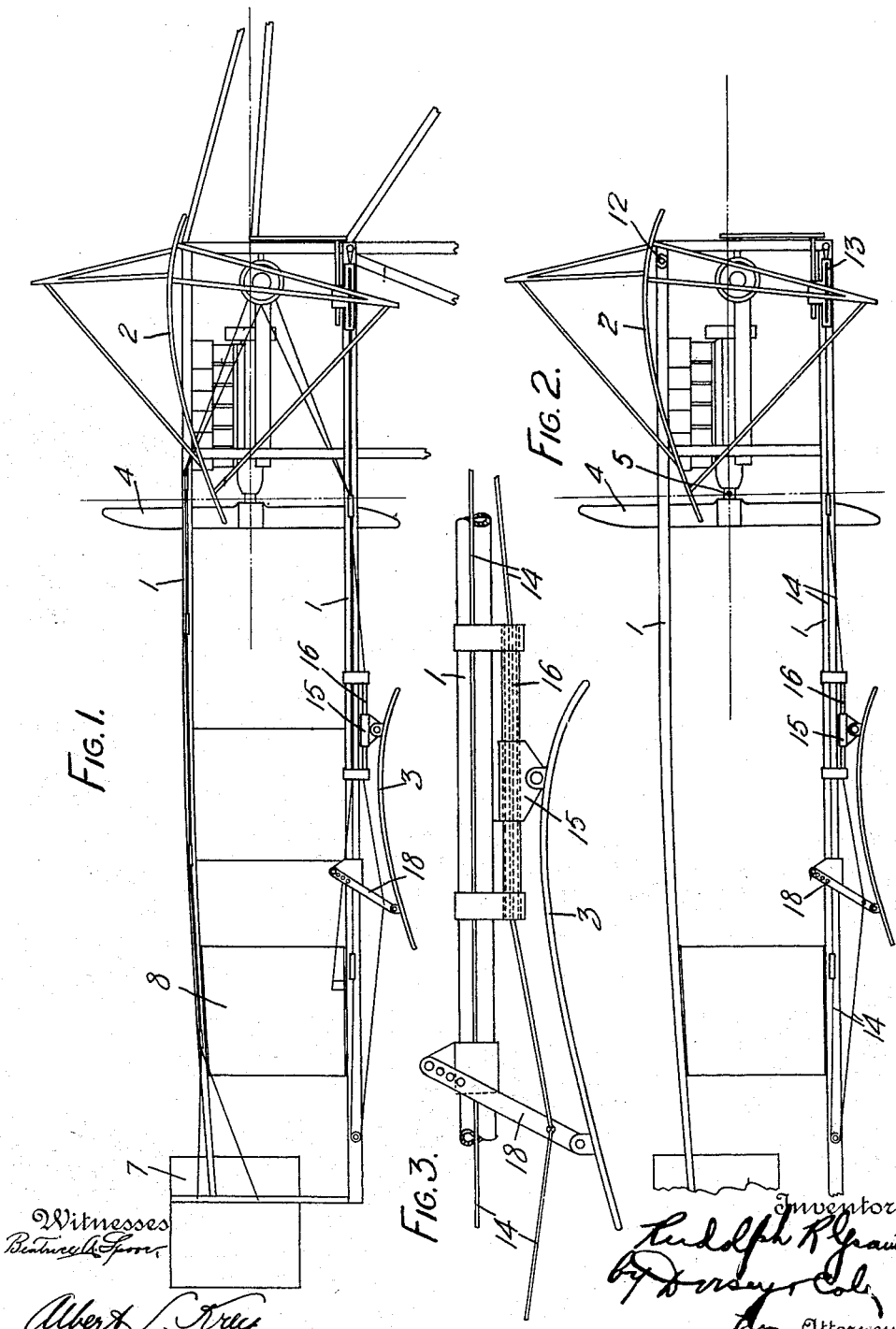

RUDOLPH R. GRANT, OF NORFOLK, VIRGINIA.

AEROPLANE.

1,195,207.      Specification of Letters Patent.      Patented Aug. 22, 1916.

Application filed October 27, 1913. Serial No. 797,603.

*To all whom it may concern:*

Be it known that I, RUDOLPH R. GRANT, a citizen of the United States of America, and a resident of the city of Norfolk, State of Virginia, have invented certain new and useful Improvements in Aeroplanes, of which the following is a specification.

The object of this invention is to provide an aeroplane having the centers and the direction of the application, of its forces, reaction and masses so positioned in respect to each other as to insure the automatic safety of the machine when in the air. For this purpose the parts of the machine are so designed that its center of gravity or mass and its center of drift pressure, as well as the center of application of propulsive power thereto are practically co-incident, and are at normal speed of horizontal flight slightly in advance of the center of lifting effort; that with increase of speed the center of lifting effort will shift forwardly; and that the center of lifting effort and center of gravity are both located in the line of thrust. By this construction upon turning the machine upon its center of gravity without substantially displacing the center of the propeller, and with only an angular change in the position thereof the propeller does not by its thrust resist or aid such change or swing of the machine, the only action of the propeller being that of a gyroscope tending to prevent change in the angular position of the axis of the machine. Moreover, by the described location of the center of pressure in respect to the center of gravity at normal speed of horizontal flight, the elevators are normally called upon to slightly lift the head of the machine. A slowing down of the machine effects such a change in the balancing factors thereof (the location of the center of pressure in respect to the center of gravity) that the machine will drop slightly by the head and thus start to glide, with its attendant increase of drift speed, whereupon the center of pressure will again move forwardly and tend to head the machine up, this being repeated in case of injury to the motive power and as often as may be necessary to effect a safe landing by a series of glides and recoveries. This is accomplished by shifting the center of gravity of the machine slightly forward of the center of lifting effort, but such displacement must be properly designed for each machine, and while the displacing movement is limited, it is dependent upon the camber and shape of the lifting surfaces, so that the relative location of and the distance between the center of lifting effort and the center of gravity to accomplish the desired results in the desired manner must be properly proportioned in each machine, for the center of gravity cannot for purposes of safety be placed too much forward of the center of lifting effort in normal horizontal flight as it would cause the machine to tip suddenly by the head and fall. Moreover, as in the machine as to which I have particularly desired to apply the invention herein described, the supporting planes are so mounted that variation may be made in their angle of incidence and as an increase in the angle of incidence is made by the aviator when desiring to slow down the machine, (which increase tends to move the center of lifting effort, and thus disturb the balancing condition of the machine), I provide means whereby the relative position of the fore and aft supporting planes may be varied co-incident with the change in angle of incidence thereof, to maintain the center of lifting effort constant in respect to the center of gravity. This requires the presence of fore and aft supporting surfaces, inasmuch as the center of pressure of a bi-plane, or of a machine having wings located one above the other is lowered by a decrease of speed in the machine. This part of my invention is especially applicable to machines of the monoplane type and to machines in which the desired vertical position of the center of pressure is obtained by placing the rear plane behind and below the front planes. The design of the machine is further such that the center of pressure remains substantially in the line of thrust and does not vary vertically in respect to the center of gravity, in spite of its forward and back movement in respect thereto at different speeds. This is important in insuring lateral and directional stability under various conditions.

Referring to the accompanying drawings in which the corresponding parts are designated by similar marks of reference:—

Figure 1 is a diagrammatic view of an aeroplane to which my broad invention is applicable. Fig. 2 is a side elevation showing my complete invention as applied to a machine provided with supporting surfaces, the inclination of which may be varied. Fig. 3 is an enlarged view of the rear supporting plane showing its mounting and the means by which its angle of incidence is changed.

Referring to Fig. 1, the machine there shown comprises a central fuselage 1 having on each side of the front thereof forward pivoted supporting surfaces 2 and underneath its rear portion a rear pivoted supporting surface 3, the latter being below the front surface and having its center of pressure below the line of thrust, and being at a less angle of incidence than the front planes, while the front planes have their center of pressure above and on the upper side of the line of thrust. A propeller 4 is mounted in the line of thrust, the center of the propeller being substantially at or slightly in the rear of the center of gravity of the machine, which may be designated by the point 5, the center of the propeller being as close thereto as the limitation will admit. Proper elevating and steering surfaces 7 and 8 are provided as usual. The parts of the machine are so designed that the center of drift pressure or head resistance is substantially co-incident with the center of gravity, and is located in the line of thrust of the propeller 4 and that these conditions are maintained substantially constant in all positions of the machine. The machine is further so designed that with this constant relation of the above described factors, the center of lifting effort resulting from the front and rear supporting surfaces is at normal speed of horizontal flight slightly behind the center of gravity, whereby the elevators are normally called upon to do work to maintain horizontal flight. The combined center of lifting effort, however, is under the construction of the machine substantially maintained in the line of thrust at all speeds of the machine. Presuming that the supporting planes are properly designed to cause the center of lifting effort to move forwardly upon an increase of speed and to move rearwardly upon a decrease of speed, as is the case when their curvature is that of the cissoid of Diocles, as is described in the French Patent No. 456,587 if the machine slows down with a fixed position of the supporting surfaces and of the elevator, the center of lifting effort will move rearwardly, thereby causing the head of the machine to drop and the machine to glide, and to thus recover speed, whereupon the center of lifting effort will again move forwardly, and whereupon, if the speed, due to the glide runs above normal, will pass forward of the center of gravity thereby throwing the head of the machine up. As the machine again slows down, the action is repeated. Thus the relation of the centers and lines of applications of the various forces above referred to forms an inherent longitudinal stabilizer by which a machine possessing them, and the motive power of which is installed, will descend in a series of glides and recoveries.

In Fig. 2, I have shown a construction by which the relation of the physical factors before discussed may be obtained and held in an aeroplane of the construction shown in the co-pending application of Rudolph R. Grant and Charles O. Morse, filed February 6, 1912, Serial No. 675,893. In the machine shown in that application and represented in part in Fig. 2 of this application, the front planes 2 are pivoted at 12 to the fuselage and are movable on such pivots to change their angle of incidence. The mechanism for this purpose comprises travelers 13 sliding longitudinally in the fuselage of the machine, there being one traveler on each side of the machine connected to the corresponding front surface. The rear plane 3 is also pivoted to the fuselage and is moved upon such pivot by means of connecting wires 14, one wire being connected to each traveler and to the corresponding side of the rear plane, the inclination of the rear plane being less than that of the front plane. The curvature of the front and rear planes may both be that of the cissoid of Diocles. In such a construction, the machine can be slowed down by increasing the angle of incidence of the several planes, but due to the character of the curve of the planes this is accompanied by a rearward shifting of the center of lifting effort on each of the planes, and therefore, unless means be provided to prevent it, by a rearward shifting of the combined center of lifting effort in respect to the center of gravity and a consequent disturbance of the balancing conditions of the machine. To prevent this my present invention in its perfected form contemplates a bodily movement of the rear plane upon the fuselage upon a change of angle of incidence, whereby it will be moved forwardly upon an increase of the angle of incidence of the several planes and will be moved rearwardly upon a decrease of the angle of incidence of such planes, and whereby the conjoint center of pressure of the several planes under varying conditions of angles of incidence will be maintained substantially constant in respect to the center of gravity. To effect this longitudinal movement of the rear plane upon a change of angle of incidence I pivot the rear plane in blocks 15 sliding on bars 16 depending from the lower members of the fuselage. The rear end of the rear supporting plane is adapted to be angularly adjusted by means of links 18 pivoted to the fuselage and to the plane and having connected thereto intermediate of their ends the connecting wires 14, one end of which wires may be led through the slide bar 16, the other end of such wires 14 being passed over pulleys to the rear of the supporting plane and returned through leaders and passed over pulleys in front of the travelers 13 to which the other end of the wire 14 is connected. The link 18 contains a series of perforations whereby the desired angle of incidence may be obtained according to the several conditions which may arise. With this construction, upon an increase of the angle of the forward planes, the wires 14 will be drawn forwardly, moving the links 18 upon their pivots on the fuselage and causing the lower ends of such links to swing downwardly and forwardly. The downward movement of the ends of the links results in an increase of the angle of incidence of the rear plane, and at the same time causes the plane to be moved forwardly as a whole in respect to the fuselage and to the center of gravity of the machine, thereby maintaining the desired constant relation between the combined center of the lifting effort of the several planes and the center of gravity within all normal angles of flight.

Having thus described my invention what I claim is:—

1. An aeroplane in which at speed of normal horizontal flight, the center of gravity is in front of the center of lifting effort and is in the rear thereof at excessive speeds above the same.

2. An aeroplane in which the center of gravity is in front of the center of lifting effort at speed of normal horizontal flight, and is in the rear thereof at speeds in excess thereof.

3. An aeroplane in which the center of gravity and center of drift pressure are maintained co-incident under varying conditions of flight, and a propeller located substantially at such co-incident point.

4. In an aeroplane in which the center of gravity and center of drift pressure are maintained co-incident under varying conditions of flight, and in which the center of lifting effort is maintained in the line of thrust under varying conditions of flight, a propeller located substantially at the center of gravity and drift pressure.

5. An aeroplane in which the center of gravity and center of drift pressure are maintained co-incident under varying conditions of the flight, and in which the center of gravity is in front of the center of lifting effort at normal speed of horizontal flight, and is in the rear thereof at speeds in excess thereto, a propeller located substantially at the center of gravity.

6. In an aeroplane in which the center of gravity and center of drift pressure are maintained co-incident and at the center of lifting effort; and are maintained in the line of thrust under varying conditions of flight, and in which the center of gravity is in front of the center of lifting effort at the speed of normal horizontal flight and is in the rear thereof at excessive speeds a propeller located substantially at the center of gravity.

7. An aeroplane having fore and aft supporting surfaces, one of the said sets of surfaces being mounted for axial movement to change the angle of incidence thereof, whereby its center of lifting effort is shifted in respect to the machine, and the other of said sets of surfaces being mounted for fore and aft movement of the machine, with means for causing said fore and aft movement of the last named surfaces upon change of the angle of incidence of the other surface, whereby the combined center of the lifting effort of the said surfaces is maintained substantially constant.

8. In an aeroplane, the combination of a supporting surface movable to change its angle of incidence, of a supporting surface movable longitudinally of the machine and means whereby the said movable surface is shifted longitudinally of the machine upon change of angle of incidence of the forward supporting surface to maintain the combined center of the lifting effort of the said surfaces substantially constant and in the rear of the center of gravity of the machine at a speed of normal horizontal flight.

9. In an aeroplane, the combination of forward supporting surfaces and a rear supporting surface located below the same, the angle of incidence of the rear surface being less than that of the forward surfaces, and means for accelerating the change of angle of incidence of one of the supporting surfaces in respect to the other.

In testimony whereof, I have signed my name.

RUDOLPH R. GRANT.

Witnesses:
F. M. DORSEY,
E. GRIFFITH DODSON.

Copies of this patent may be obtained for five cents each, by addressing the "Commissioner of Patents, Washington, D. C."